United States Patent
Klinghult et al.

(10) Patent No.: US 9,143,882 B2
(45) Date of Patent: Sep. 22, 2015

(54) CATCH THE SCREEN

(75) Inventors: Gunnar Klinghult, Lund (SE); Hakan Jonsson, Hjarup (SE); Andreas Kristensson, Sodra Sandby (SE); Ola Thorn, Limhamn (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 304 days.

(21) Appl. No.: 13/503,053

(22) PCT Filed: Jun. 1, 2011

(86) PCT No.: PCT/EP2011/059150
§ 371 (c)(1),
(2), (4) Date: Apr. 20, 2012

(87) PCT Pub. No.: WO2012/163427
PCT Pub. Date: Dec. 6, 2012

(65) Prior Publication Data
US 2013/0178244 A1    Jul. 11, 2013

(51) Int. Cl.
*H04M 1/00* (2006.01)
*H04W 4/00* (2009.01)
*H04M 1/725* (2006.01)
*H04W 4/02* (2009.01)

(52) U.S. Cl.
CPC ............ *H04W 4/00* (2013.01); *H04M 1/72572* (2013.01); *H04W 4/026* (2013.01); *H04M 1/72594* (2013.01)

(58) Field of Classification Search
USPC ...................................... 455/456.3
See application file for complete search history.

(56) References Cited

U.S. PATENT DOCUMENTS

2009/0286556 A1* 11/2009 Yumoto et al. ............. 455/456.6
2011/0035284 A1*  2/2011 Moshfeghi ................. 705/14.58
2011/0105152 A1   5/2011 Yu et al.

FOREIGN PATENT DOCUMENTS

WO    WO 02/059716 A2    8/2002
WO    WO 03/047285 A1    6/2003
WO    WO 2007/132055 A1  11/2007

OTHER PUBLICATIONS

International Search Report and Written Opinion dated Feb. 13, 2012 issued in corresponding PCT application No. PCT/EP2011/059150, 13 pages.

* cited by examiner

*Primary Examiner* — Joel Ajayi
(74) *Attorney, Agent, or Firm* — Snyder, Clark, Lesch & Chung, LLP

(57) ABSTRACT

The invention relates to a method and an system for displaying viewscreen information on a display in a mobile communication device, wherein the viewscreen information is related to information shown on a viewscreen, wherein the method comprise the steps of determining a direction to the viewscreen from the mobile communication device, communicating the determined direction to a server, determining, in the server, viewscreen information based on the direction to the viewscreen, wherein the viewscreen information is related to information displayed on the viewscreen, receiving viewscreen information from the server in the mobile communication device and displaying the viewscreen information on the display in the mobile communication device.

15 Claims, 5 Drawing Sheets

CATCH THE SCREEN

TECHNICAL FIELD

The present invention relates to the field of portable electronic devices and, in particular, to the gathering and presentation of information in such devices. The present invention especially targets the usage of mobile phones for aiding a user in download information, into the mobile phone, that are presented on an external viewscreen.

BACKGROUND

In public places such as at the train station, at the air port or in a super market, information is often presented on one or more viewscreens (i.e. monitors, display boards, screens, etc.). In many cases the information displayed on the viewscreens can be very difficult to read and/or to interpret due to factors such as bad eye sight, stress, poor reading skills or dyslexia, bad layout and design of the graphical interface (non-ergonomically chosen colors or font, information crowding, etc.) and a long distance between the person and the viewscreen. At some places, such as at a large train station, there are often a large number of persons looking at the viewscreens at the same time and they may partially or completely block the line-of-sight to the viewscreen making it very hard to read the information displayed on it.

Not being able to read the information on the viewscreen, for whichever reason, may be very frustrating and stressful to a person. Therefore, finding way to get hold of the information displayed on the viewscreens despite not being able to see or read the information displayed on the viewscreen, is highly sought after.

SUMMARY OF THE INVENTION

With the above description in mind, then, an aspect of the present invention is to provide a way to get hold of the information displayed on a viewscreen despite not being able to see or read the information displayed on the viewscreen which alleviate or eliminate one or more of the above-identified deficiencies in the art and disadvantages singly or in any combination.

A first aspect of the present invention relates to a method for displaying viewscreen information on a display in a mobile communication device, wherein said viewscreen information is related to information shown on a viewscreen, wherein the method comprising the steps determining a direction to said viewscreen from said mobile communication device, communicating said direction to a server, determining, in said server, viewscreen information based on said direction to said viewscreen, wherein said viewscreen information is related to information displayed on said viewscreen, receiving viewscreen information from said server in said mobile communication device and displaying said viewscreen information on said display in said mobile communication device.

The method may further comprise the steps of determining a geographical position of said mobile communication device and communicating said geographical position to said server, wherein said determining of said viewscreen information is further based on said geographical position.

The method may further comprise the steps of capturing an image of at least a part of said viewscreen using an image recording device in said mobile communication device, deriving image information from said captured image, and communicating said image information to said server, wherein said determining of said viewscreen information is further based on said image information.

The method wherein said determining of said direction to said viewscreen may further comprise capturing an image of at least a part of said viewscreen using an image recording device in said mobile communication device, deriving image information from said captured image, identifying graphical features from said image information and determining said direction to said viewscreen based on said graphical features.

The method wherein said geographical position of said mobile communication device may further be determined based on said graphical features.

The method wherein the determining of geographical position of said mobile communication device may further comprise determining current elevation of said mobile communication device using a pressure sensor and communicating said current elevation of said mobile communication device to said server, wherein said determining of said viewscreen information is further based on said current elevation of said mobile communication device.

The method wherein said determining of direction to said viewscreen from said mobile communication device may further be based on compass information or compass and accelerometer information of said mobile communication device.

The method wherein said determining of geographical position of said mobile communication device may further be based on one of or a combination of Global Positioning System information, Inertial Navigation System information, and network-based localization information.

A second aspect of the present invention relates to a system for displaying viewscreen information on a display in a mobile communication device, wherein said viewscreen information is related to information shown on a viewscreen, wherein the system comprising, a direction determining unit in said mobile communication device adapted to determine the direction to said viewscreen from said mobile communication device, a communication unit in said mobile communication device adapted to transmit the determined direction to said viewscreen to a server, a server adapted to receive the direction to said viewscreen from said mobile communication unit and to determine viewscreen information, related to information displayed on said viewscreen, based on received direction to said viewscreen, and adapted to transmit determined viewscreen information to said mobile communication unit, a receiving unit in said mobile communication device adapted to received viewscreen information transmitted from said server, and a displaying adapted to display said viewscreen information on said display in said mobile communication device.

The system may further comprises position determining unit adapted to determine a geographical position of said mobile communication device, wherein said communication unit is further adapted to transmit said geographical position to said server and wherein said server is further adapted to receive said geographical position from said communication device and adapted to further base the determination of said viewscreen information based on said geographical position.

The system may further comprise an image capturing unit in said mobile communication device adapted to capture an image of at least a part of said viewscreen, an image processor adapted to derive image information from said captured image and wherein said communication unit is further adapted to transmit said image information to said server; and wherein said server is further adapted to receive said image information from said communication device and adapted to further base the determination of said viewscreen information based on said image information.

The system may further comprise an image capturing unit in said mobile communication device adapted to capture an image of at least a part of said viewscreen, an image processor adapted to derive image information from said captured image, wherein the image processor is further adapted to identify graphical features from said image information and wherein said direction determining unit base the determination of the direction to said viewscreen from said mobile communication device on said graphical features.

The system may further comprise a pressure determining unit adapted to determine the current elevation of said mobile communication unit based on measured ambient pressure of said mobile communication unit, wherein said communication unit is further adapted to transmit said current elevation to said server; and wherein said server is further adapted to receive said current elevation from said communication device and adapted to further base the determination of said viewscreen information based on said current elevation.

The system wherein said direction determining unit in said mobile communication device may further determine the direction to said viewscreen from said mobile communication device based on either compass information from a compass unit in said mobile communication unit or compass information from a compass unit and acceleration information from an acceleration unit in said mobile communication unit.

The system wherein said position determining unit in said mobile communication device determines the geographical position of said mobile communication device may further be based on one of or a combination of Global Positioning System information, Inertial Navigation System information, and network-based localization information.

Any of the features in the first and second aspect of the present invention above may be combined in any way possible to form different variants of the present invention.

BRIEF DESCRIPTION OF THE DRAWINGS

Further objects, features, and advantages of the present invention will appear from the following detailed description of some embodiments of the invention, wherein some embodiments of the invention will be described in more detail with reference to the accompanying drawings, in which.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments and variations set forth herein. Rather, these embodiments and variations are provided so that this disclosure will be thorough and complete, and will fully convey the scope of the invention to those skilled in the art. Like reference signs refer to like elements throughout.

Embodiments of the present invention will now be exemplified using a portable communication device such as a mobile phone. However, it should be appreciated that the invention is as such equally applicable to electronic devices in general. Examples of such devices may for instance be any type of mobile phone, laptops (such as standard, ultra portables, netbooks, and micro laptops), handheld computers, PDAs, gaming devices, pads, accessories to mobile phones, etc. However, for the sake of clarity and simplicity, the embodiments outlined in this specification are exemplified with and related to mobile phones only. The word viewscreen, which is used through the text, should be interpreted as any form of display or screen capable of showing any kind of dynamic or static information.

Figure 1:
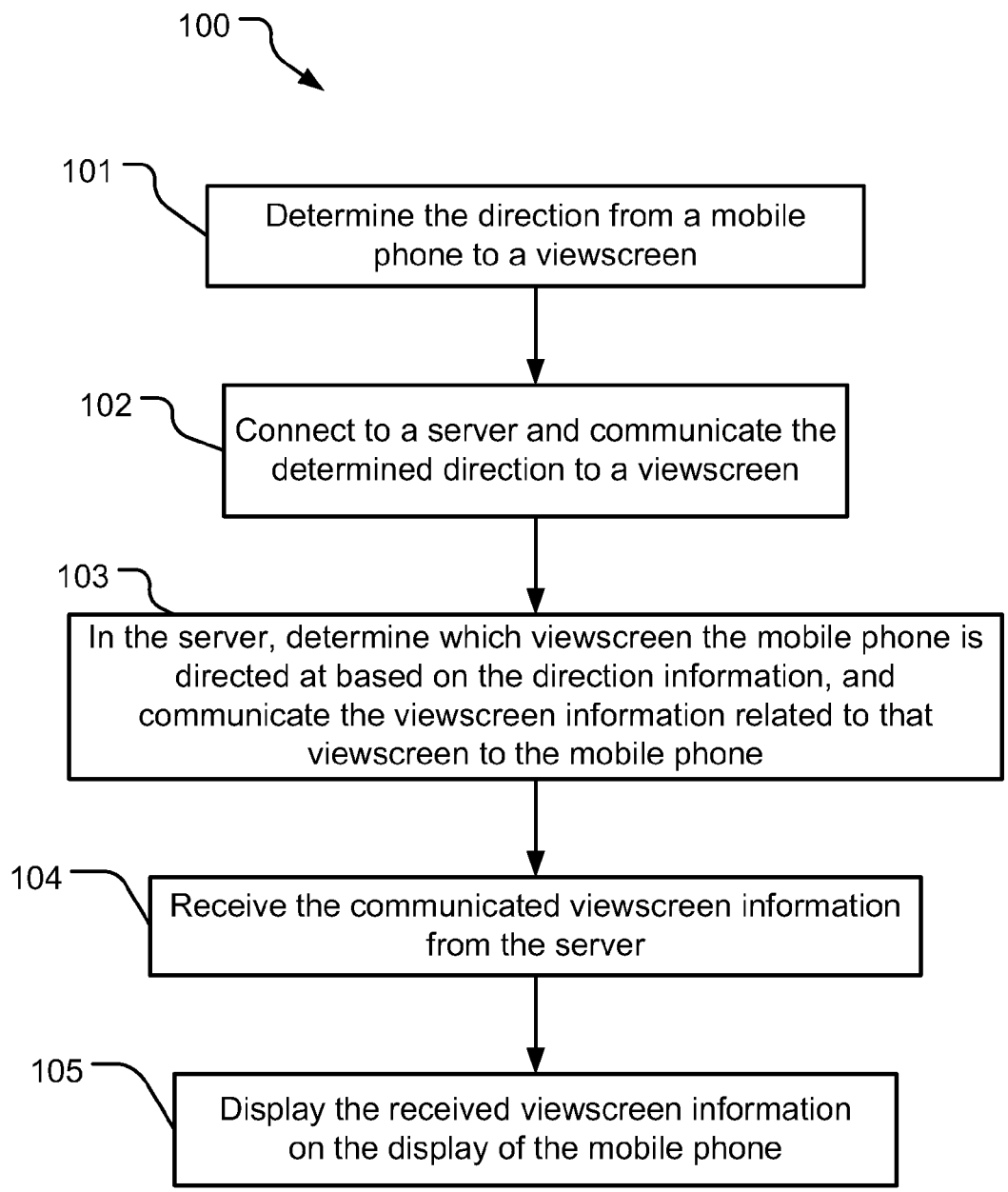
FIG. 1 shows a flowchart of the basic steps of an embodiment of the present invention.

A way to get hold of information displayed on viewscreen, despite not being able to see or read the displayed information, is to acquire the viewscreen information and display it in a mobile phone according to an embodiment of the present invention. The basic steps of doing this are shown in the flowchart 100 in FIG. 1.

The user of the mobile phone may aim or point the mobile phone in the direction of the viewscreen of which information, from hereinafter referred to as viewscreen information, he or she wants to read or look at. The direction in which the mobile phone is aimed may in an embodiment of the present invention then be determined 101 using compass information from a built-in compass in the mobile phone. The built-in compass may determine a general heading or orientation of the mobile phone which could be used to determine in which direction 101 the mobile phone is aimed or pointed in. The compass in the mobile phone may either be realized using a gyrocompass, which is a technique based on a gyroscope, or a solid state compass, which is a technique that either is be based on magnetic field sensors or on a Global Position System (GPS) using two or more antennas. In a variant of the embodiment above the compass could be realized by a combination of the techniques mentioned above. In yet another variant a built-in accelerometer (such as a tri-axis accelerometer) in the mobile phone may be used together with the compass to determine the general direction 101 in which the mobile phone is aimed or pointed.

The determined direction may in an embodiment of the present invention then be communicated 102 to an external server. The communication 102 may for instance be performed using any wireless mobile communication technique, light based communication technique (such as infrared light signaling), or sound based communication technique (such as signaling using infrasound) available in the mobile phone. In a variant two or more of the above techniques may be used in cooperation to communicate 102 with the server.

When the server has received 102 the determined direction 101 from the mobile phone the server tries to determine, based on the determined direction 101, which viewscreen the mobile phone is or was aimed at 103. If the current location has multiple viewscreens the geographical position of the mobile phone may have to be determined to accurately pinpoint which viewscreen the mobile phone is or was aimed at.

Determining of the geographical position of the mobile phone may be done in several different ways. In an embodiment of the present invention a built-in GPS unit in the mobile phone may determine the current geographical position of the mobile phone. The determined geographical position may then be communicated to the server at the same time as the determined direction 101 is communicated 102. Having access to the geographical position of the mobile phone will make it much easier for the server to pinpoint which viewscreen (in three dimensions) the user has aimed the mobile phone at.

In a variant the current geographical position, and/or the direction in which the mobile is pointing, may be determined using an Inertial Navigation System (INS) which is a navigation system that uses built-in accelerometers and gyroscopes to continuously calculate via dead reckoning the position, orientation, and velocity (direction and speed of movement) of a mobile phone. In the same way as with the GPS, INS information containing the current geographical location of the mobile phone may be communicated 102 to the server at the same time as the determined direction 101 is communicated, and thus be used to pinpoint which viewscreen the mobile phone is aimed at. In a variant the direction in which the mobile phone is pointing and the current geographical position is both determined at the same time 101 using the INS system and communicated 102 to the server.

In yet another variant any network-based, handset-based or SIM-based tracking and location determination method may be used to determine the geographical position of the mobile phone. In the same way as with the GPS- and INS information, described above, the position information containing the current geographical location of the mobile phone may be communicated 102 to the server at the same time as the determined direction 101 is communicated, and thus be used to pinpoint which viewscreen the mobile phone is or was aimed at.

In an embodiments of the present invention any of the geographical position determination techniques described above may be combined with the usage of a built-in pressure sensor in the mobile phone to determine the ambient air pressure which can be used to determine the current elevation of the mobile phone over (or under) a reference point such as the sea level at current position. In this way it will for instance be easy to determine on which floor the mobile phone is located at in a high-rise building where several floors have viewscreens.

When the server has determined which viewscreen the mobile phone is or was aimed at 103, the information displayed on that viewscreen at the time when the mobile phone was aimed at it may be determined and obtained by the server 103. In an embodiment of the present invention the server determining which viewscreen the mobile phone is or was aimed at may be the same as the server storing and displaying the information on the viewscreen. In a variant the server must contact a second server or an information service provider and download the information displayed on the viewscreen in question.

The downloaded information displayed on the viewscreen may not be suitable to be displayed in a mobile phone so the server may have to convert the information into a mobile phone friendly format. The converted information, hereinafter referred to as viewscreen information, may then be communicated 104 to the mobile phone using any wireless mobile communication technique, light based communication technique (such as infrared light signaling), sound based communication technique (such as signaling using infrasound), or combination thereof. The communication technique used by the mobile phone to communicate 102 with the server does not necessarily be the same as the communication technique used by the server to communicate 104 with the mobile phone.

The communicated 104 viewscreen information from the server to the mobile phone may then be displayed on a display in the mobile phone 105. In this way the user of the mobile phone may read the information displayed on the viewscreen in his or hers mobile phone without having to struggle reading the information on the viewscreen. In an embodiment of the present invention the viewscreen information may be an exact copy of the information displayed on the viewscreen, and in a variant it may be an excerpt of the information displayed on the viewscreen.

In the mobile phone the viewscreen information may be subjected to further processing depending on the user's preferences and/or needs. For instance, if the user is visually impaired the font, the font size and the contrast of the viewscreen information may be altered to aid the user in reading the information. If necessary, the text in the viewscreen information may be read out loud to the user using text-to-speech technology, and/or displayed on a miniature pin-array tactile module in the mobile phone. If the user is color blind the colors of the viewscreen information may be changes to facilitate reading to the text and looking at the graphical information. Since the viewscreen information is in the mobile phone it can easily be read "on the run" and thus eliminate some of the stress of standing still in front of the large viewscreen trying to find the information you are after while being in a hurry.

In another embodiment of the present invention an image capturing device in the mobile phone, i.e. a camera module in the mobile phone, may be used to further enhance the present invention. If the viewscreen which the user is interested in is visible to the user, the camera in the mobile phone may be pointed at the viewscreen and an image of the viewscreen may be taken. The image containing image information, which may be the whole unprocessed image or a part of the image, may then be communicated (preferably at the same time as the directional information and/or the geographical location information is communicated 102) to the server. The server may then use the image information together with the determined direction (of the camera shot in this case) and/or the geographical position information to determine which viewscreen the user is interested in and has aimed the mobile phone (i.e. the camera in this case) at. The server or the mobile phone may in an embodiment pre-process the image by for instance applying a character recognition program to determine text based information and/or it may apply a graphical recognition program capable of extracting graphical elements in the image and compare them with images stored in a data base located in the mobile phone or in the server. The identified text and graphical elements (such as symbols, trademarks, etc.) may be used by the server to determine the viewscreen of interest or it may be used to search for and/or download further information related too the information on the viewscreen. In a variant the present invention image information may also be used to determine the direction and geographical position by identifying graphical features such as known landmarks, architectural features, graphics, symbols, etc. in the recorded image and calculating the current poison of the mobile phone using the identified graphical features.

In a variant, the user may be prompted to physically point out, on the display of the mobile phone, the viewscreen of interest if the image contains more than one viewscreen and/or if the server has trouble determining which viewscreen the user is interested in. The prompting of the user may in a variant be done by the mobile phone right after the image has been captured or it may be done by the server by sending back the image together with a request to the user's mobile phone.

In yet another embodiment of the present invention the viewscreen information compiled by the server and communicated to the mobile phone may contain enriched or 'active' information. For instance, the enriched information may contain browsable information and links to other related information not present in the viewscreen information presented on the mobile phone display or on the viewscreen.

In yet another embodiment of the present invention a custom made application may be resident in or communicated from the server to the mobile phone, which when executed cooperates with the communicated viewscreen information by for instance searching for related information stored in the mobile phone and if such information is found connect it or use it together with the viewscreen information to further enhance the viewscreen information. An example of this is for instance when the viewscreen information consists of a time table for a train journey the application may search the users' mail box and/or SMS communications to determine if the user has an electronic ticket for the journey or not. If the user hasn't got an electronic ticket for the journey he or she could be prompted and asked if he or she is interested in buying a train ticket using the mobile phone.

To better understand the embodiments of the present invention and all their variants described above, some use-cases are now going to be described.

Figure 2:
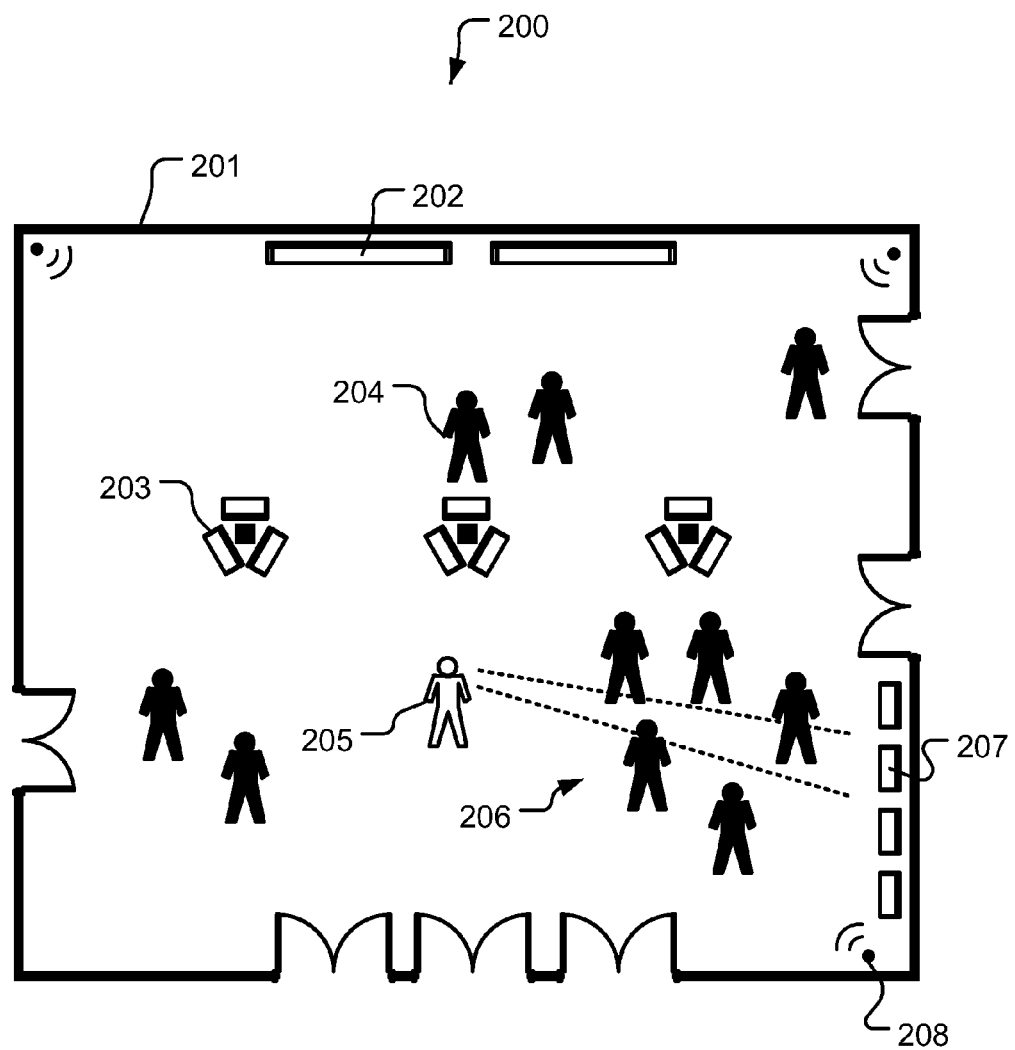
FIG. 2 shows a schematic of a waiting hall of a train station with people looking at different viewscreens, according to an embodiment of the present invention.

FIG. 2 shows the waiting hall 201 of a train station 200. The waiting hall is equipped with two large display boards 202 (i.e. two viewscreens) and several smaller screens (i.e. also viewscreens) 203, 207 placed in groups in the waiting hall 201. The different viewscreens displays information about departing and arriving trains, connecting busses, delays, ticket information, traffic information, etc. A visually impaired person 205 enters the waiting hall 201 to determine when the train to Lund central (Lund C) is leaving. The waiting hall is full of people 204 waiting and watching the viewscreens. The visually impaired person 205 think he has located the viewscreen 207 that will give him the information he is after but the font on the viewscreen 207 is very small and impossible for him to read due to his bad eyesight. He tries to move closer to the viewscreen 207 in question but there is a crowd of people 206 standing and watching the viewscreens 207 which blocks his way. Instead of pushing his way through the crowd he reaches for his mobile phone, aims the camera of the mobile phone at the viewscreen 207 he is interested in and take a snapshot of the viewscreen 207. He only got a partial shot of the viewscreen but that is enough. When the image is taken the application embodying the present invention in the mobile phone determines the direction and the current location of the mobile phone in the waiting hall. Since the user is indoors the GPS signal is poor but the three micro base stations 208 covering the waiting hall could be used to determine the location of the mobile phone by for instance triangulation. The image information, together with direction information and positioning information, is then communicated to the train stations 200 server for analysis. The server determines with the help of the partial image, the direction information and the positioning information which viewscreen 207 the user of the mobile phone aimed the mobile phone at. When the server has determined which viewscreen the mobile phone was aimed at the server looks up the information that is or was displayed on the viewscreen 207. In this case the viewscreen showed a time table of departing trains to Lund C. The server then collects the information and compiles it into a mobile phone friendly viewscreen information format and communicates the viewscreen information to the user's mobile phone. The mobile phone receives the viewscreen information and displays it on the display of the mobile phone. In this way the user may look at the same information as displayed on the viewscreen 207 on his mobile phone. The user may then apply special programs for visually impaired persons which may format the viewscreen information to an even more user friendly format.

Figure 3:
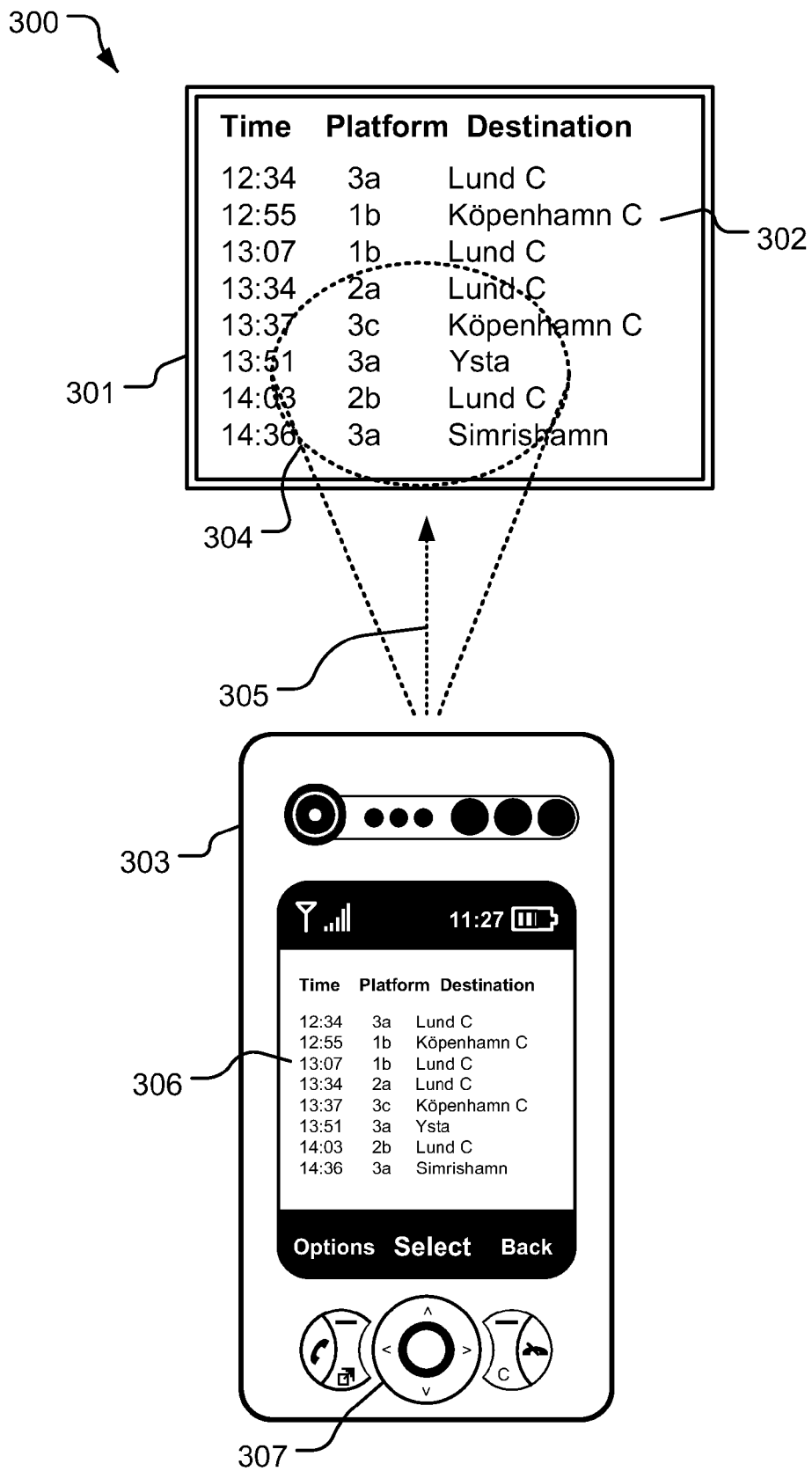
FIG. 3 shows an example of how information displayed on a viewscreen may be captured and shown on the display of a mobile phone, according to an embodiment of the present invention.

FIG. 3 shows an example of how it could look when a mobile phone catches the information 300 displayed on a viewscreen 301, and displays it on a display in a mobile phone 303. The viewscreen 301 displays the time, platform and destination of departing trains 302 from the train station. The mobile phone is aimed 305 (illustrated by the dotted arrow) at the viewscreen 301 and an image is taken of a part 304 of the viewscreen 301 (illustrated by the dotted ellipse 304 on the viewscreen 301). After that the mobile phone 303 has communicated with the server and received viewscreen information from it, the information 302 on the viewscreen 301 is now presented on the display 306 in the mobile phone 303. The user may then operate the navigation means 307 on the mobile phone 303 to maneuver the viewscreen information 306 displayed in the mobile phone 303.

Figure 4:
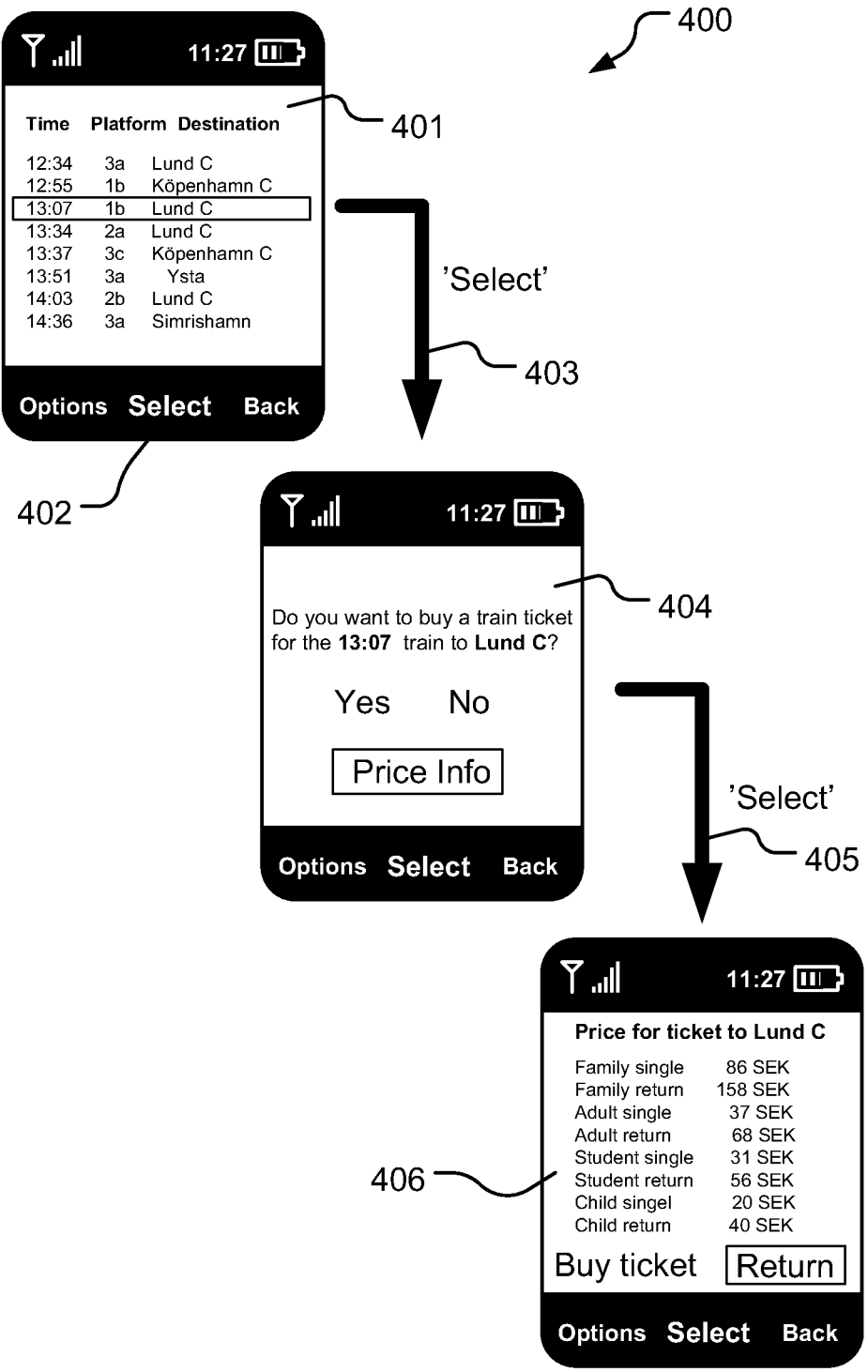
FIG. 4 shows an example of how received viewscreen information may be utilized, according to an embodiment of the present invention.

FIG. 4 show an example of how enriched information 400 may be utilized in the mobile phone 303. In the first display example 401 the user has navigated to the departure he is interested in, in this case the departure at 13:07 to Lund C from platform 1b, indicated by the box. The user then selects, using the soft buttons 402, the departure wherein the display changes 403 into a new display 404 showing a question regarding if the user want to buy a train ticket for that particular departure to Lund C. The user then selects 405 (indicated by the box in 404) the 'Price info' option wherein the display changes again, and displays the different prices 406 for a ticket to Lund C for that departure.

Figure 5:
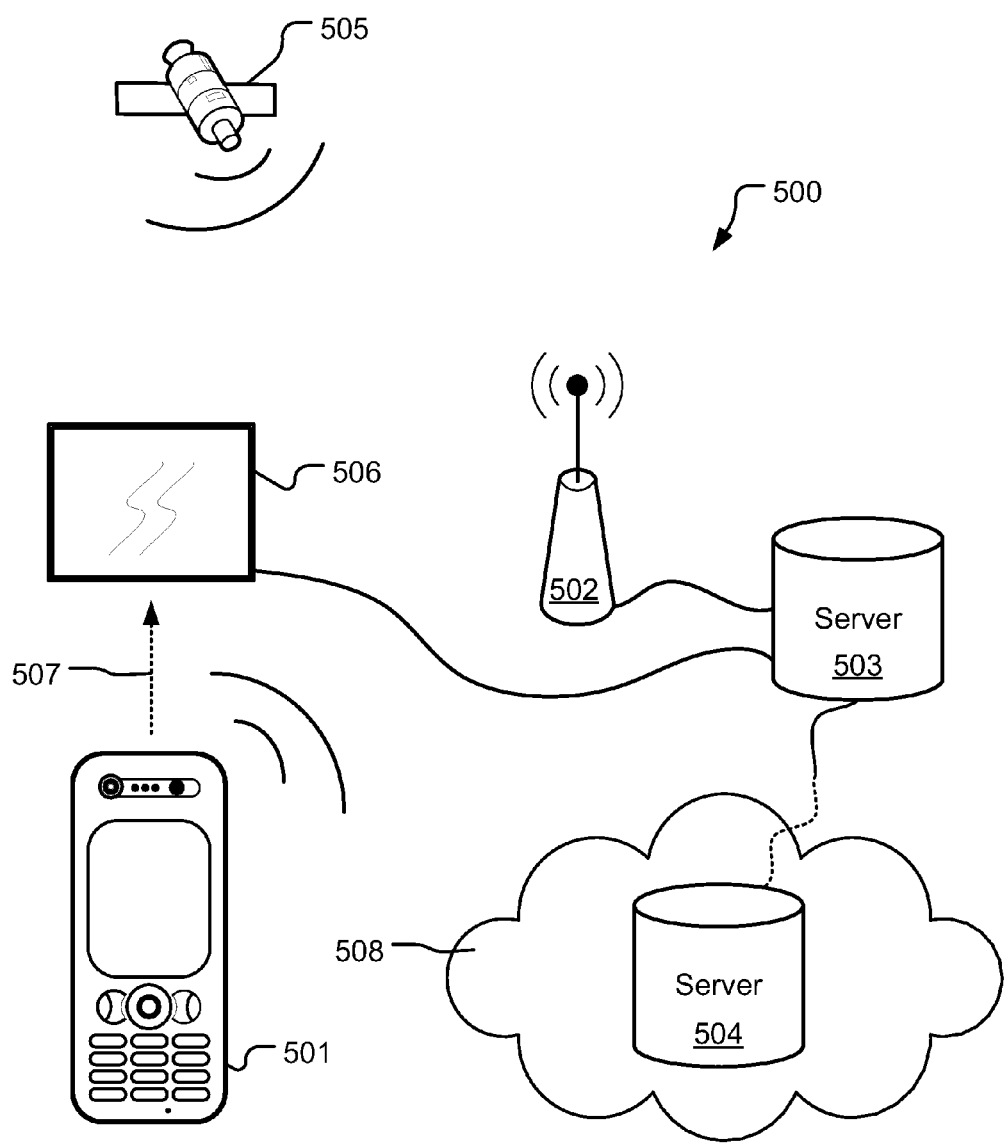
FIG. 5 shows a block diagram of a system according to an embodiment of the present invention.

FIG. 5 shows an example of a system 500 embodying the present invention. The mobile phone 501 is aimed at a viewscreen 506. The direction 507 to the viewscreen 506 is determined in the mobile phone and the current geographical position information is in this case determined using GPS satellites 505. The direction and the geographical position information is communicated via a base station 502 to a server 503, wherein the server 503 determines which viewscreen 506 the mobile phone was aimed 507 at. When the viewscreen has been determined the information displayed on the viewscreen 506 is compiled and formatted into a mobile friendly format by the server 503. The viewscreen information is then communicated to the mobile phone 501 via the base station 502. In an embodiment, the serve 503 may contact an additional server 504 somewhere in the Internet 'cloud' 508 to gather more related information to the information presented on the viewscreen (for instance cost information for a specific train departure). The gathered information is then embedded into the viewscreen information and communicated to the mobile phone 501.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method for displaying viewscreen information on a display in a mobile communication device, comprising:
    determining a direction to said viewscreen from said mobile communication device by determining an orientation of the mobile communication device;
    communicating said direction and a time when the direction from said mobile communication device to said viewscreen was determined to a server;
    determining, in said server, viewscreen information based on said direction and said time, wherein said viewscreen information comprises information that was displayed on said viewscreen at said time or is displayed on said viewscreen;
    receiving said viewscreen information from said server in said mobile communication device; and
    displaying said viewscreen information on said display in said mobile communication device.

2. The method according to claim 1, further comprising:
    determining a geographical position of said mobile communication device; and
    communicating said geographical position to said server, wherein said determining of said viewscreen information is further based on said geographical position.

3. The method according to claim 1, further comprising:
    capturing an image of at least a part of said viewscreen using an image recording device in said mobile communication device;
    deriving image information from said captured image; and
    communicating said image information to said server, wherein said determining of said viewscreen information is further based on said image information.

4. The method according to claim 1, wherein said determining of said direction to said viewscreen comprises:
    capturing an image of at least a part of said viewscreen using an image recording device in said mobile communication device;
    deriving image information from said captured image;
    identifying graphical features from said image information; and
    determining said direction to said viewscreen based on said graphical features.

5. The method according to claim 2, wherein said geographical position of said mobile communication device is determined based on said graphical features.

6. The method according to claim 2, wherein the determining of geographical position of said mobile communication device further comprises:
    determining current elevation of said mobile communication device using a pressure sensor; and
    communicating said current elevation of said mobile communication device to said server, wherein said determining of said viewscreen information is further based on said current elevation of said mobile communication device.

7. The method according to claim 1, wherein said determining of direction to said viewscreen from said mobile communication device is based on compass information or compass and accelerometer information of said mobile communication device.

8. The method according to claim 2, wherein said determining of geographical position of said mobile communication device is based on one of or a combination of: Global Positioning System information, Inertial Navigation System information, and Network-based localization information.

9. A system for displaying viewscreen information on a display in a mobile communication device, wherein the system comprises:
    a direction determining unit in said mobile communication device adapted to determine a direction to said viewscreen from said mobile communication device by determining an orientation of the mobile communication device;
    a communication unit in said mobile communication device adapted to transmit the direction and a time when the direction from said mobile communication device to said viewscreen was determined to a server;
    a server adapted to receive the direction from said communication unit and to determine viewscreen information, wherein the viewscreen information comprises information displayed on said viewscreen or information that was displayed on the viewscreen at the time, based on the received direction to said viewscreen and the time, and the server is further adapted to transmit the determined viewscreen information to said mobile communication unit;
    a receiving unit in said mobile communication device adapted to received the viewscreen information transmitted from said server; and
    a display adapted to display said viewscreen information on said display in said mobile communication device.

10. The system according to claim 9, further comprising:
    a position determining unit adapted to determine a geographical position of said mobile communication device, wherein said communication unit is further adapted to transmit said geographical position to said server; and
    wherein said server is further adapted to receive said geographical position from said communication device and adapted to further base the determination of said viewscreen information on said geographical position.

11. The system according to claim 9, further comprising:
    an image capturing unit in said mobile communication device adapted to capture an image of at least a part of said viewscreen; and
    an image processor adapted to derive image information from said captured image;
    wherein said communication unit is further adapted to transmit said image information to said server; and
    wherein said server is further adapted to receive said image information from said communication device and adapted to further base the determination of said viewscreen information on said image information.

12. The system according to claim 9, further comprising:
    an image capturing unit in said mobile communication device adapted to capture an image of at least a part of said viewscreen; and an image processor adapted to derive image information from said captured image, wherein the image processor is further adapted to identify graphical features from said image information;

wherein said direction determining unit further bases the determining of the direction to said viewscreen from said mobile communication device on said graphical features.

13. The system according to claim 10, further comprising:

a pressure determining unit adapted to determine the current elevation of said mobile communication unit based on measuring an ambient pressure of said mobile communication unit, wherein said communication unit is further adapted to transmit said current elevation to said server; and wherein said server is further adapted to receive said current elevation from said communication device and adapted to further base the determination of said viewscreen information on said current elevation.

14. The system according to claim 9, wherein said direction determining unit in said mobile communication device determines the direction to said viewscreen from said mobile communication device based on either compass information from a compass unit in said mobile communication unit or compass information from a compass unit and acceleration information from an acceleration unit in said mobile communication unit.

15. The system according to claim 10, wherein said position determining unit in said mobile communication device determines the geographical position of said mobile communication device based on one of or a combination of: Global Positioning System information, Inertial Navigation System information, and network-based localization information.

* * * * *